(12) United States Patent
Meier

(10) Patent No.: US 7,667,548 B2
(45) Date of Patent: Feb. 23, 2010

(54) OSCILLATION MAINTENANCE CIRCUIT FOR HALF DUPLEX TRANSPONDER

(75) Inventor: Herbert Meier, Moosburg (DE)

(73) Assignee: Texas Instruments Deutschland GmbH, Freising (DE)

( * ) Notice: Subject to any disclaimer, the term of this patent is extended or adjusted under 35 U.S.C. 154(b) by 187 days.

(21) Appl. No.: 11/831,213

(22) Filed: Jul. 31, 2007

(65) Prior Publication Data

US 2009/0033411 A1 Feb. 5, 2009

(30) Foreign Application Priority Data

Jul. 31, 2006 (DE) .................. 10 2006 035 582

(51) Int. Cl.
*H03B 11/10* (2006.01)
*H03B 5/08* (2006.01)
*G01S 13/74* (2006.01)

(52) U.S. Cl. .................. 331/166; 331/167; 342/42; 342/51; 327/596

(58) Field of Classification Search .................. 331/167, 331/15, 165, 166, 182, 183; 327/596; 342/42, 342/51
See application file for complete search history.

(56) References Cited

U.S. PATENT DOCUMENTS

| 5,126,745 | A | | 6/1992 | Steinhagen et al. |
| 5,196,735 | A | * | 3/1993 | Meier et al. .................. 327/100 |
| 5,227,740 | A | | 7/1993 | Steinhagen et al. |
| 5,283,529 | A | | 2/1994 | Meier |
| 5,347,280 | A | * | 9/1994 | Schuermann .................. 342/42 |
| 5,621,396 | A | | 4/1997 | Flaxl |
| 5,793,324 | A | * | 8/1998 | Aslanidis et al. .............. 342/51 |
| 6,547,149 | B1 | * | 4/2003 | Wuidart et al. .............. 235/492 |
| 6,806,783 | B2 | | 10/2004 | Baumann et al. |
| 7,372,359 | B2 | * | 5/2008 | Wuidart et al. ............. 340/10.1 |

* cited by examiner

*Primary Examiner*—Robert Pascal
*Assistant Examiner*—Levi Gannon
(74) *Attorney, Agent, or Firm*—William B. Kempler; Wade J. Brady, III; Frederick J. Telecky, Jr.

(57) ABSTRACT

An oscillation maintenance circuit for a half-duplex transponder that has an LC resonant circuit, a storage capacitor and a rectifier connected to charge the storage capacitor with a rectified oscillation signal, having an end-of-burst detector providing an end-of-burst signal when the amplitude of the oscillation signal has dropped below a predetermined threshold. A clock regenerator provides a clock signal derived from the oscillation signal. Switching means controlled by the clock signal in the presence of the end-of-burst signal connect the storage capacitor with LC resonant circuit through at least one current limiting resistor during part of the period of the clock signal, in such a manner that energy is fed into the LC resonant circuit.

22 Claims, 3 Drawing Sheets

O1 = 6.3937n, 3.7082
O2 = 6.3863n, 3.6820
DIF = 7.4583O, 25.332n

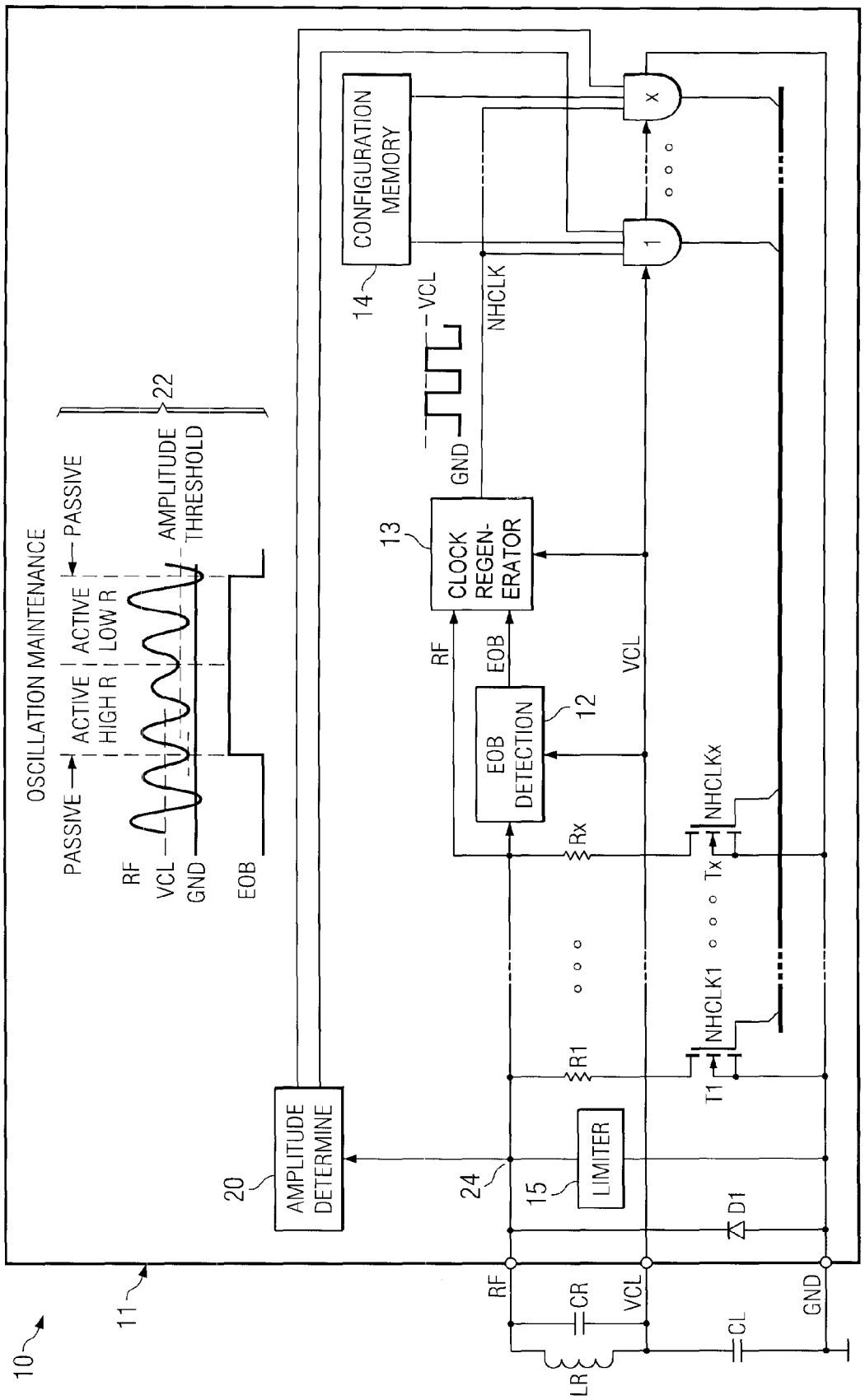

OSCILLATION MAINTENANCE CIRCUIT FOR HALF DUPLEX TRANSPONDER

FIELD OF THE INVENTION

The present invention relates to an oscillation maintenance circuit for a half-duplex transponder.

BACKGROUND OF THE INVENTION

Half-duplex (HDX) transponders are used in "passive" RFID tags that have no autonomous power supply. Instead, they use the RF energy received with an antenna and an LC oscillating circuit from a transmitter during an interrogation interval by rectifying the received RF signal and charging a storage capacitor with the rectified signal. The end of the interrogation interval is detected by an end-of-burst (EOB) detector. The interrogation interval is followed by a response interval where the transponder is expected to send some response, e.g. an ID code or some other data. Energy for operating the transponder's transmitter during the response interval is supplied by the storage capacitor. Since the same antenna and LC oscillating circuit are used in both of the interrogation and response intervals, and the oscillation amplitude of the LC oscillation circuit decreases with time as soon as an RF signal is no longer received from the interrogation transmitter, there a need to maintain oscillation by stimulating the LC oscillation circuit. Energy for such stimulation is available from the storage capacitor.

In a conventional solution (U.S. Pat. No. 6,806,738, EP 1 233 371 Bi), sophisticated circuitry is provided for detecting the negative peak value of the oscillation signal and injecting energy from a low impedance source into the LC oscillating circuit just for a short time after the detection of the negative peak value. By analogy to an acoustic oscillating system, this is referred to as "plucking".

The "plucking" approach has proven to be efficient, but it is complicated and needs a lot of analog circuitry that is difficult to implement in CMOS technology. Also, the oscillation signal is distorted by the sudden injection of energy during a short fraction of the oscillation period, and a frequency shift is observed.

SUMMARY OF THE INVENTION

Once aspect of the present invention takes a different approach. Instead of injecting energy into the oscillating circuit during just a small fraction of the oscillating period and at the peak value of the oscillation signal (i.e. instead of "plucking"), the inventive concept is to smoothly feed energy into the oscillating circuit during a large fraction of the oscillation period, in particular during an entire half period, but from a current source of a high internal impedance.

Specifically, in this aspect of the present invention an oscillation maintenance circuit is provided for a half-duplex transponder that has an LC resonant circuit, a storage capacitor and a rectifier connected to charge the storage capacitor with a rectified oscillation signal. The oscillation maintenance circuit comprises an end-of-burst detector providing an end-of-burst signal when the amplitude of the oscillation signal has dropped below a predetermined threshold. The circuit also comprises a clock regenerator providing a clock signal derived from the oscillation signal. Switching means controlled by the clock signal in the presence of the end-of-burst signal connect the storage capacitor with the LC resonant circuit through at least one current limiting resistor during part of the period of the clock signal, in such a manner that energy is fed into the LC resonant circuit. In this way, the oscillation signal is sustained and remains at a constant amplitude. Furthermore, the signal is not distorted and there is no frequency shift because the energy is fed smoothly over a longer period into the LC resonant circuit.

The frequency of the clock signal may be identical with the frequency of the oscillating signal. This means that the storage capacity or is connected with the LC resonant circuit during every second half-period of the clock signal, thereby maintaining the amplitude at a constant level.

The circuit may be implemented as an integrated CMOS circuit. However, with this technology, resistive elements are subject in resistance value to major process variations. To address this problem, an aspect of the invention also comprises a plurality of current limiting resistors, each associated with a corresponding switch in the switching means. Also, the switching means can be configured to selectively connect predetermined current limiting resistors in parallel. With this configuration, an aspect of the inventive circuit can respond to various application requirements regarding the quality factor of the resonant circuit.

The circuit may further comprise a non-volatile configuration memory that stores the configuration of the switching means. The configuration memory can be programmable and programmed to connect those of the current limiting resistors in parallel which, when connected in parallel, approximate a predetermined target resistance value. In this way, any manufacturing tolerances in the current limiting resistors can be cancelled out and a desired value of current limiting resistance can be achieved, in spite of the CMOS technology used. Each switch in the switching means can be controlled by the output of an associated AND gate. Then each of the AND gates should have a first input connected to an output of the configuration memory and a second input to which the clock signal is applied.

BRIEF DESCRIPTION OF THE DRAWINGS

Further characteristics and advantages of the invention ensue from the description below of a preferred embodiment, and from the accompanying drawings, in which:

FIG. 4 illustrates a second embodiment of the present invention having dynamic adaptation of the resistance value.

DETAILED DESCRIPTION

Figure 1:
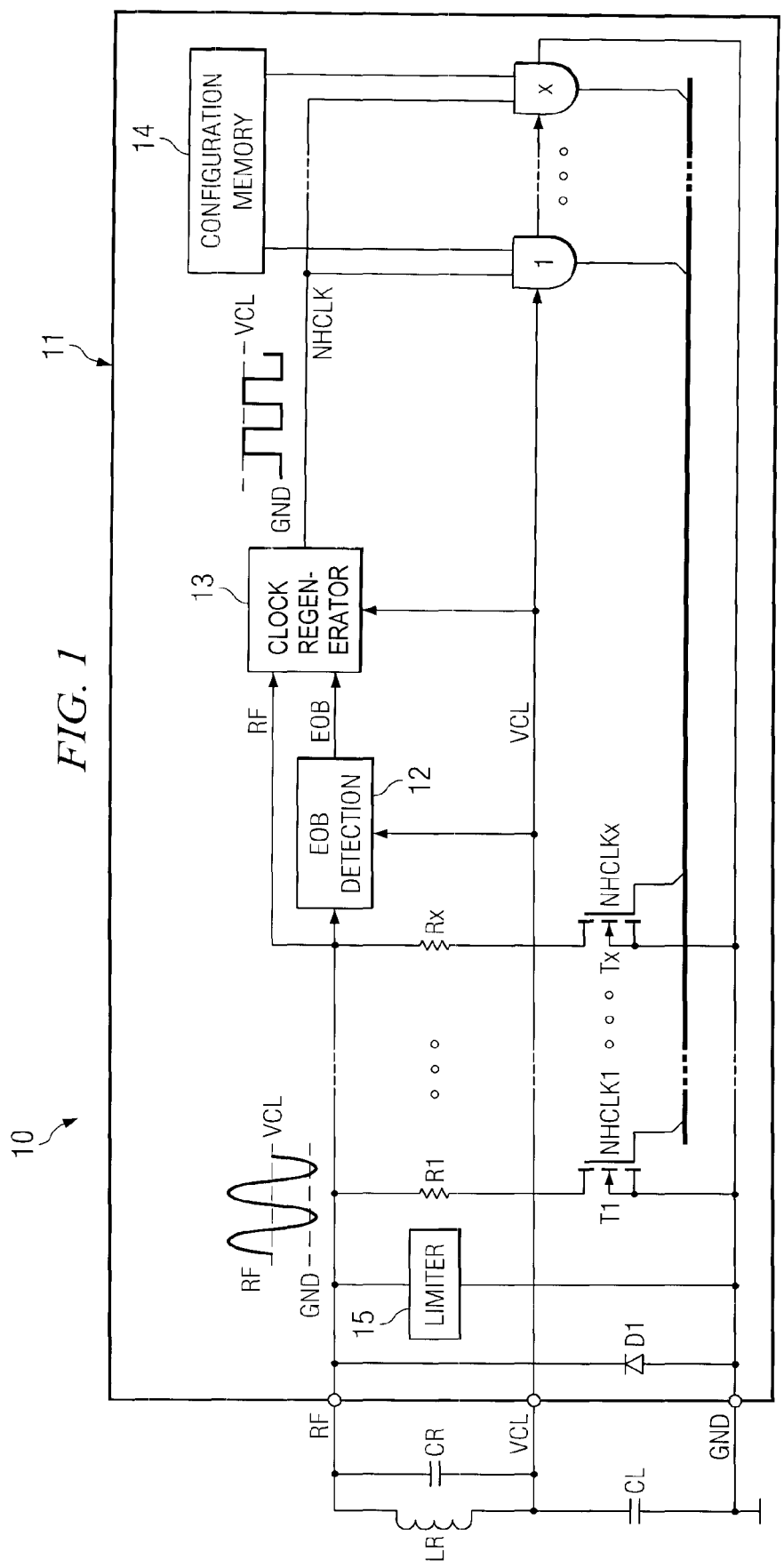
FIG. 1 is a schematic diagram of a half duplex transponder integrated circuit having an oscillation maintenance circuit according to the present invention.

A half duplex (HDX) transponder 10 includes an integrated circuit 11 and a resonance circuit with an inductor LR connected in parallel with a first external capacitor CR. A second external capacitor CL is connected in series between the inductor LR and ground. This circuit arrangement is well-known in the art and is commonly used in RFID tags, with the parallel LC circuit being operable to receive interrogation signals during an interrogation interval and transmit response signals during a following response interval. The second capacitor CL is a storage capacitor. When an interrogation signal is received by the transponder, it is rectified by an internal diode Di of the integrated circuit 11 and this causes the capacitor CL to charge. The capacitor CL then stores energy, which can be used by the LC resonant circuit to enable it to generate a response signal.

The integrated circuit 11 has input terminals RF, VCL and GND. The RF signal from the LC resonant circuit oscillates with respect to the VCL level. The diode DI and a limiter circuit 15 are connected between the GND rail and the RF voltage rail. The RF voltage rail is also connected to the input of an end of burst (EOB) detector 12 and one input of a clock regenerator 13. The output of the EOB detector 12 is connected to another input of the clock regenerator 13. The clock regenerator 13 is operable to generate a square wave pulse having a maximum amplitude equal to VCL. The output of the clock regenerator 13 is connected to one input of each of an array of AND gates (AND1 . . . ANDx). A configuration memory 14 has an output connected to another input of each of the array of AND gates (AND1 . . . ANDx). The output of each of the AND gates (AND1 . . . ANDx) is connected to the gate of a corresponding transistor in an array of transistors (T1 . . . Tx). The transistors (T1 . . . Tx) are each associated with a corresponding current limiting resistor R1 to Rx and have their source connected to GND. The current limiting resistors R1 to Rx connect the transistors at their drain to the RF rail. The number of resistors in the array will depend on the manufacturing tolerances of the resistors. The number of transistors required in the array (T1 . . . Tx) and the number of AND gates in the array (AND1 . . . ANDx) should then be the same as the number of resistors in the circuit 11. The AND gates, transistors and resistors form a switching means, which allows the storage capacitor CL to be connected to the LC resonant circuit when the LC resonant circuit requires energy to sustain the RF oscillation signal.

The electromagnetic field of an interrogator unit (not shown) transmitting at a frequency of between about 120 and 140 kHz stimulates the parallel resonant circuit connected between the RF and VCL terminals of the integrated circuit 11. The RF oscillation is rectified by the internal diode D1 connected between RF and GND and charges the storage capacitor CL to a voltage VCL during the negative half wave of the oscillation. The amplitude of the oscillation at RF is limited by the limiter circuit 15 to protect the circuit 11 from excess voltage.

When the interrogator unit switches off, and thus stops transmitting an RF signal, the RF oscillation amplitude of the LC oscillation circuit drops. This is detected by the end of burst (EOB) detector 12. The EOB detector 12 then sends a signal to one of the inputs of the clock regenerator 13. The other input of the clock generator is the RF signal from the LC oscillation circuit. When both the signal from the EOB detector 12 and the RF signal are received at the inputs of the clock regenerator 13, this causes the clock regenerator 13 to generate a clock signal NHCLK, which is actually derived from the oscillation signal of the LC resonant circuit.

Figure 2:
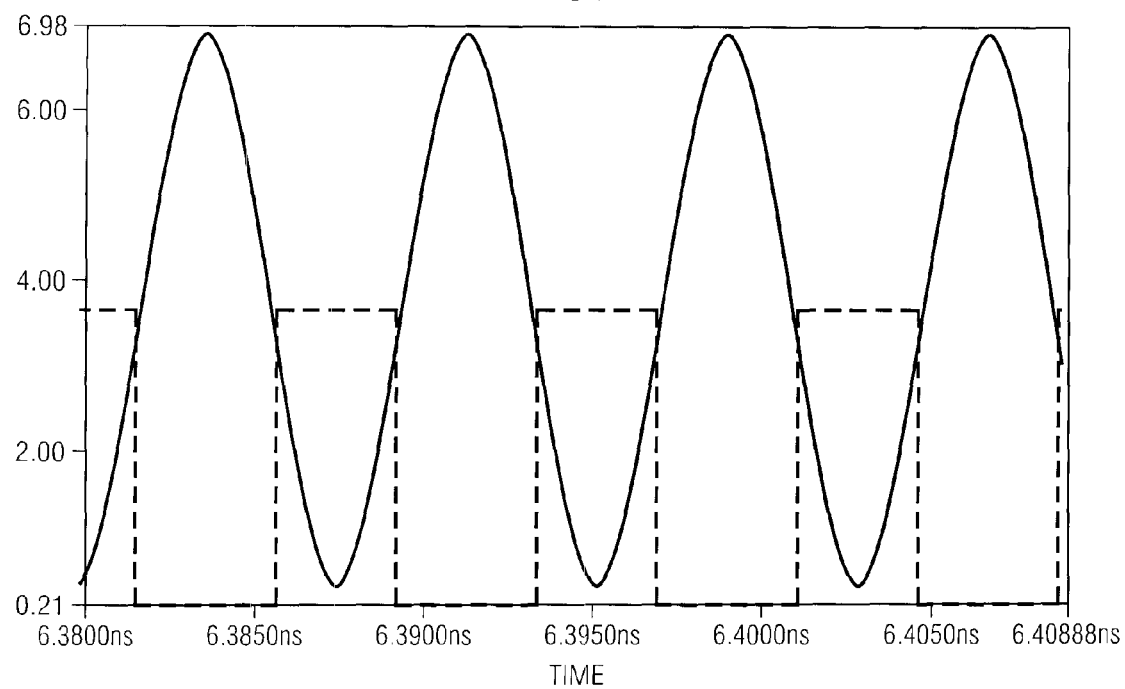
FIG. 2 is a representation of a regenerated clock signal representing negative half wave provided by a clock regenerator in the oscillation maintenance circuit according to the present invention.

The clock signal NHCLK is high exactly during the negative half-wave of the RF signal. Both the RF signal and the clock signal NHCLK plotted against time are shown in FIG. 2.

The clock signal NHCLK is then input to one input of each of the AND gates (AND1 . . . ANDx). The output of the configuration memory 14 is input to the other input of each of the AND gates (AND1 . . . ANDx). The configuration memory 14 is a non-volatile memory, which stores the configuration of the switching means for connecting the storage capacitor CL with the LC resonant circuit. The configuration memory 14 comprises data about the value of resistance required to switch on the storage capacitor CL, so as to allow the correct value of current to flow in the LC resonant circuit. The configuration memory can then enable the AND gate or gates in the array (AND1 . . . ANDx) which allows the correct combination of resistors (R1 . . . Rx) to be switched.

In the case that the content of the configuration memory 14 has enabled the related AND gate, the corresponding transistors in the array T1 . . . Tx are switched on simultaneously with NHCLK=high (NHCLK1 . . . NHCLKx). The activated transistors then switch the corresponding resistors (R1 . . . Rx) to GND so that a current flows from CL during the negative half-waive of the RF signal. The number of resistors and transistors used in the array depends on the resistor accuracy, which in turn depends on the design process of the circuit 11. Also, depending on different quality factor ranges of the LC resonant circuit, the antenna coupling factors, more resistors may be required to achieve the required range of current limiting resistance.

Figure 3:
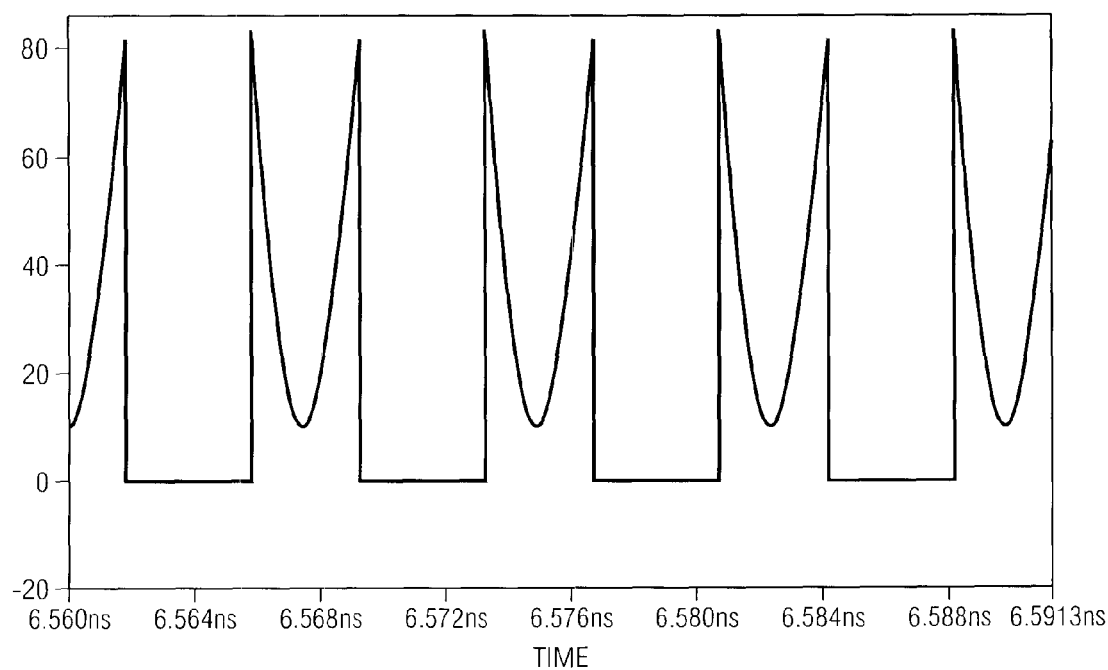
FIG. 3 is a representation of the current flowing in a current limiting resistor in the oscillation maintenance circuit according to the present invention.

The current flow through the resistors changes depending on the RF waveform and amplitude. When the voltage crosses the VCL level, the current is high and decreases to a minimum at the negative peak of the half-wave, increasing again until VCL is reached. A representation of current flowing in a current-limiting resistor is shown in FIG. 3. It can be seen that the current tracks the negative half-wave of the RF oscillation signal and the clock signal NHCLK.

This provides a constant feed of energy to the LC resonant circuit to enable it to transmit an RF response signal to the interrogation unit that does not deteriorate over time. The oscillation maintenance circuit is particularly advantageously used in RFID tags, for example in immobilizer systems, where the response signal is required to be of sufficient length and duration to send identification information to the interrogation unit.

It should be understood that the integrated circuit 11 of the half duplex transponder 10 does not just comprise the components of the oscillation maintenance circuit. In a practical implementation of a HDX transponder, the integrated circuit 11, or chip, would include a central processor unit (CPU), and further memory and control circuitry. However, these further circuit components are well known in the art and will not be described here.

In a further embodiment, shown in FIG. 4, a dynamic adaptation of resistance value of the current limiting resistors is achieved to compensate for changes of the quality factor as can be caused by external influence, e.g. from the presence of metal in the vicinity of the inductor LR. In this embodiment, the amplitude of the oscillation signal is monitored with an amplitude threshold detector 20. The input of amplitude detector 20 is connected to node 24 and outputs are connected a third inputs to AND gates 1 . . . x as shown in graph 22. When the amplitude falls below a predetermined threshold, in particular due to a reduction of the quality factor, a control signal is provided to the switching arrangement to connect an additional limiting resistor and reduce the resistance value of the combined resistors. This compensates for the higher loss of energy in the resonant circuit.

Although the present invention has been described hereinabove with reference to a specific embodiment, it is not limited to this embodiment and no doubt further alternatives will occur to the skilled person that lie within the scope of the invention as claimed.

The invention claimed is:

1. An oscillation maintenance circuit for a half-duplex transponder that has an LC resonant circuit, a storage capacitor and a rectifier connected to charge the storage capacitor with a rectified oscillation signal, comprising:

an end-of-burst detector providing an end-of-burst signal when an amplitude of an oscillation signal has dropped below a predetermined threshold;

a clock regenerator providing a clock signal derived from the oscillation signal;

and switching means controlled by the clock signal in the presence of the end-of-burst signal to connect the storage capacitor to the LC resonant circuit through at least one current limiting device during part of the period of the clock signal, for feeding energy into the LC resonant circuit to maintain an amplitude of the oscillation signal therein.

2. The circuit according to claim 1 wherein the at least one current limiting device comprises at least one resistor.

3. The circuit according to claim 2, wherein the frequency of the clock signal is substantially identical with the frequency of the oscillation signal and the storage capacitor is connected with the LC resonant circuit through the at least one current limiting resistor during a half-period of the clock signal.

4. The circuit according to claim 2, implemented as an integrated CMOS circuit wherein resistive elements are subject in resistance value to major process variations, and further comprising a plurality of current limiting resistors each associated with a corresponding switch in the switching means, the switching means being configured to selectively connect predetermined ones of the current limiting resistors in parallel.

5. The circuit according to claim 4, and further comprising a non-volatile configuration memory wherein storing the configuration of the switching means.

6. The circuit according to claim 5, wherein the configuration memory is programmable and is programmed to connect those of the current limiting resistors in parallel which connected in parallel approximate a predetermined target resistance value.

7. The circuit according to claim 6, wherein each switch in the switching means is controlled by the output of an associated AND gate, each of which has a first input connected to an output of the configuration memory and a second input to which the clock signal is applied.

8. The circuit according to claim 4, and further comprising an amplitude threshold detector that monitors the amplitude of the oscillation signal and provides a control signal to the switching means to reduce the resistance value of the combined current limiting resistors when the amplitude falls below a predetermined threshold.

9. The circuit according to claim 3, implemented as an integrated CMOS circuit wherein resistive elements are subject in resistance value to major process variations, and further comprising a plurality of current limiting resistors each associated with a corresponding switch in the switching means, the switching means being configured to selectively connect predetermined ones of the current limiting resistors in parallel.

10. The circuit according to claim 5, and further comprising an amplitude threshold detector that monitors the amplitude of the oscillation signal and provides a control signal to the switching means to reduce the resistance value of the combined current limiting resistors when the amplitude falls below a predetermined threshold.

11. The circuit according to claim 6, and further comprising an amplitude threshold detector that monitors the amplitude of the oscillation signal and provides a control signal to the switching means to reduce the resistance value of the combined current limiting resistors when the amplitude falls below a predetermined threshold.

12. The circuit according to claim 9, and further comprising an amplitude threshold detector that monitors the amplitude of the oscillation signal and provides a control signal to the switching means to reduce the resistance value of the combined current limiting resistors when the amplitude falls below a predetermined threshold.

13. A half-duplex transponder having an LC resonant circuit and a storage capacitor for providing energy to maintain oscillation in the LC resonant circuit, comprising:

a current limiting device coupled between the storage capacitor and the LC resonant circuit;

a switch controlling current through the current limit device, the switch being responsive to a clock signal derived from the oscillation in the LC resonant circuit and an amplitude of the oscillation in the LC resonant circuit for feeding energy into the LC resonant circuit during part of the period of the clock signal to maintain an amplitude of an oscillation signal therein.

14. The half-duplex transponder according to claim 13 wherein the at least one current limiting device comprises at least one resistor.

15. The half-duplex transponder according to claim 14, wherein the frequency of the clock signal is identical with the frequency of the oscillation signal and the storage capacitor is connected with the LC resonant circuit through the at least one current limiting resistor during a half-period of the clock signal.

16. The half-duplex transponder according to claim 15, implemented as an integrated CMOS circuit wherein resistive elements are subject in resistance value to major process variations, and further comprising a plurality of current limiting resistors each associated with a corresponding switch in the switching means, the switching means being configured to selectively connect predetermined ones of the current limiting resistors in parallel.

17. The half-duplex transponder according to claim 16, and further comprising a non-volatile configuration memory wherein storing the configuration of the switching means.

18. The half-duplex transponder according to claim 17, wherein the configuration memory is programmable and is programmed to connect those of the current limiting resistors in parallel which connected in parallel approximate a predetermined target resistance value.

19. The half-duplex transponder according to claim 18, wherein each switch in the switching means is controlled by the output of an associated AND gate, each of which has a first input connected to an output of the configuration memory and a second input to which the clock signal is applied.

20. The half-duplex transponder according to claim 13, and further comprising an amplitude threshold detector that monitors the amplitude of the oscillation signal and provides a control signal to the switching means to reduce the resistance value of the current limiting device being combined current limiting resistors when the amplitude falls below a predetermined threshold.

21. A method of maintaining oscillation in an LC resonant circuit of a half-duplex transponder using energy stored in a storage capacitor comprising:

deriving a clock signal from the oscillation in the LC resonant circuit;

detecting end-of-burst when an amplitude of the oscillation in the LC resonant circuit drops below a first predetermined threshold;

switching a current limiting device between the storage capacitor and the LC resonant circuit during part of the period of the clock cycle in the presence of the detected end-of-burst for feeding energy into the LC resonant circuit, to maintain an amplitude of an oscillation signal therein.

22. The method of claim 21 further comprising:
monitoring the amplitude of the oscillation in the LC resonant circuit to generate a control signal for reducing resistance value of the current limiting device when the amplitude falls below a second predetermined threshold.

* * * * *